United States Patent [19]

Van Brakel

[11] Patent Number: 4,694,523

[45] Date of Patent: Sep. 22, 1987

[54] TIRE SCRUBBING MACHINE FOR AUTOMATIC CAR WASHERS

[75] Inventor: Russel A. Van Brakel, Oneida County, Wis.

[73] Assignee: Haverberg Auto Laundry Equipment Company, Chicago, Ill.

[21] Appl. No.: 830,054

[22] Filed: Feb. 14, 1986

[51] Int. Cl.$^4$ ............................................. B60S 3/06
[52] U.S. Cl. ................................. 15/53 B; 15/DIG. 2
[58] Field of Search ............... 15/53 A, 53 AB, 53 B, 15/DIG. 2, 97 B

[56] References Cited

U.S. PATENT DOCUMENTS 3,305,886  2/1967  Fricke .................................. 15/53 B
3,822,431  7/1974  Van Brakel ......................... 15/53 B

FOREIGN PATENT DOCUMENTS 2223111  11/1973  Fed. Rep. of Germany ...... 15/53 B

Primary Examiner—Edward L. Roberts
Attorney, Agent, or Firm—Seed and Berry

[57] ABSTRACT

A machine for scrubbing the sidewalls of tires on motor vehicles in automatic car washing facilities has a swing frame presenting a track for a carriage on which is mounted a pickup roller to be engaged by the tread face of a tire, a rotary scrub brush arranged to engage only the sidewall of the tire, and a brush contact limiting roller also arranged to engage the sidewall. The rotary axis of the brush is tilted so that the brush operates in the forward lower quadrant of the tire sidewall.

13 Claims, 12 Drawing Figures

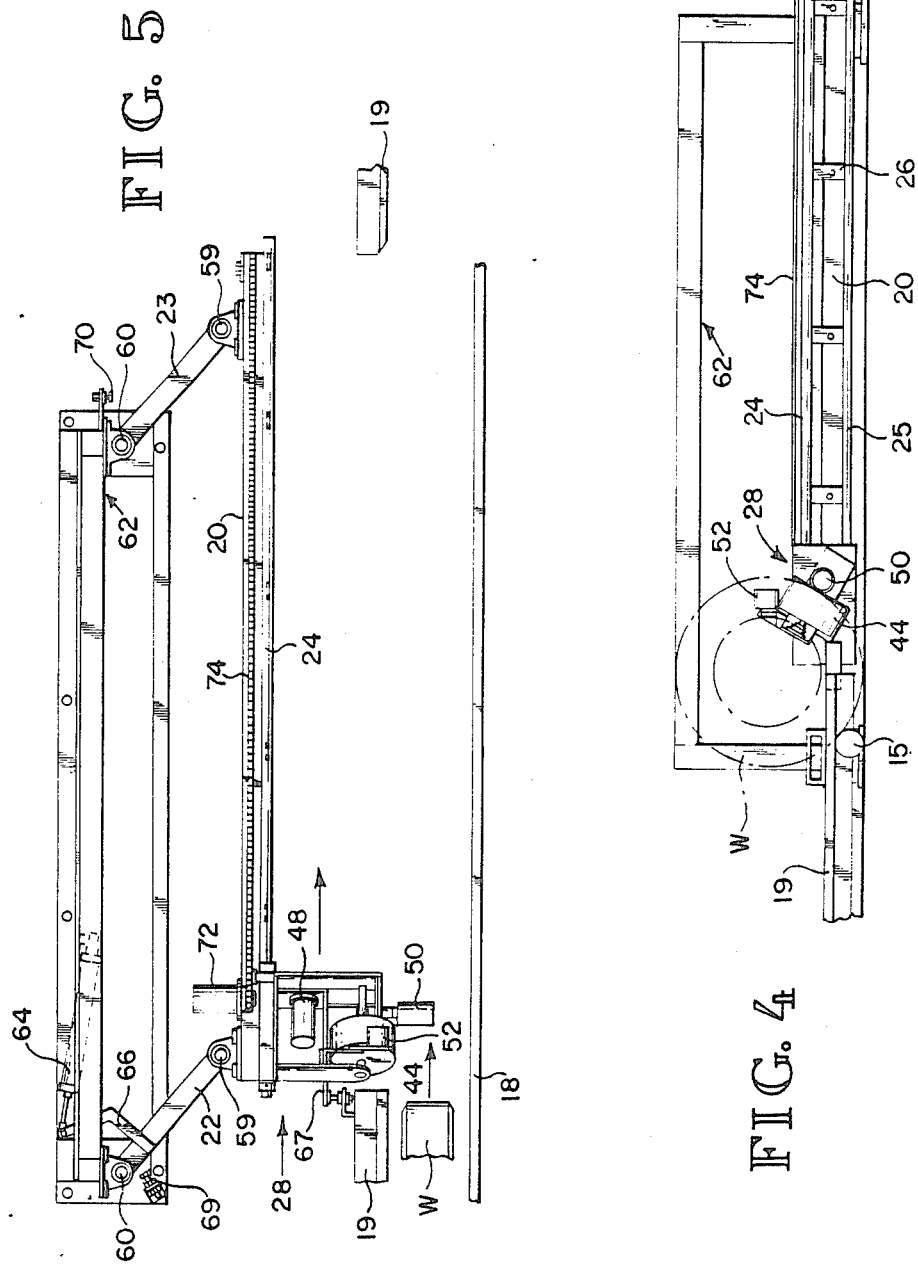

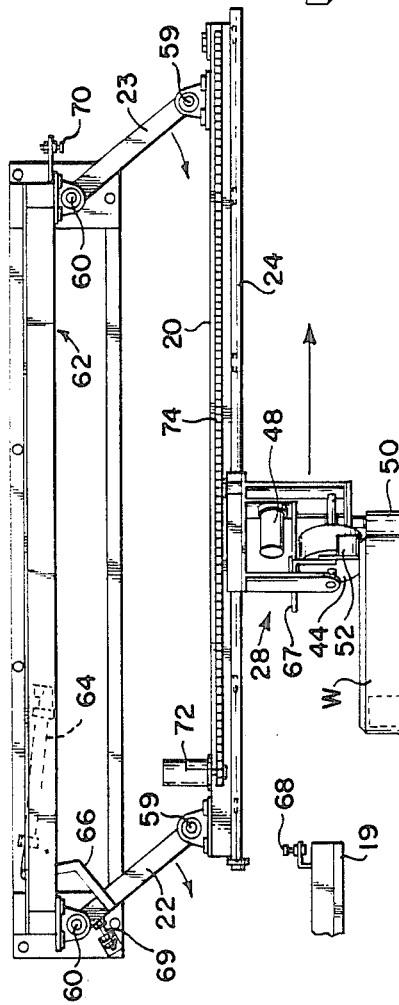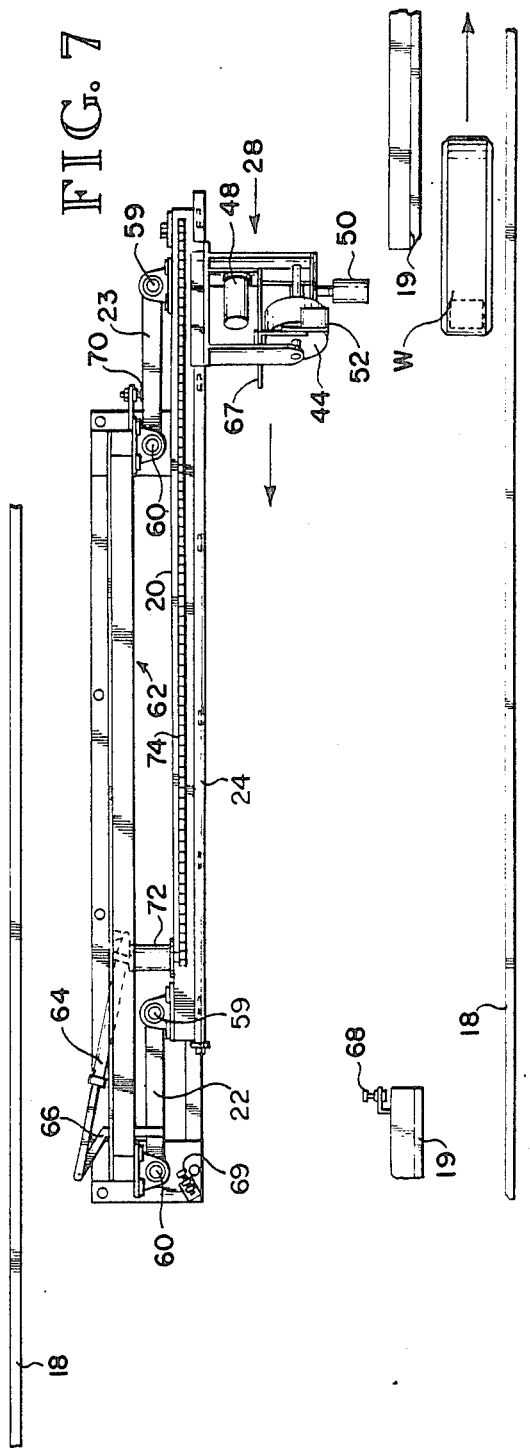

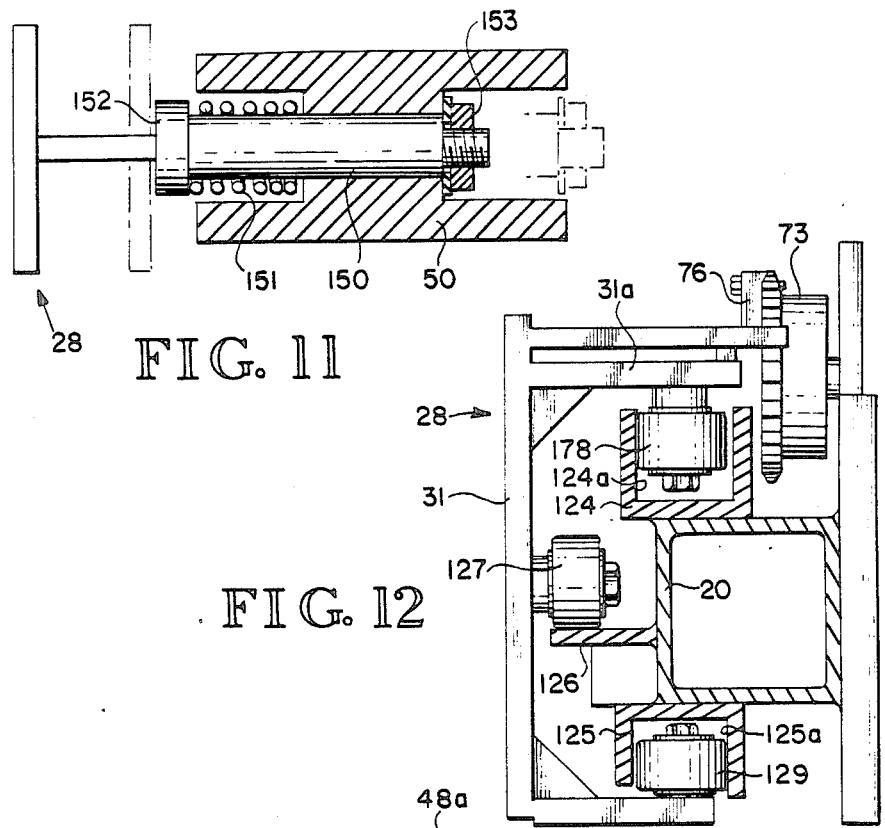
FIG. 11
FIG. 12
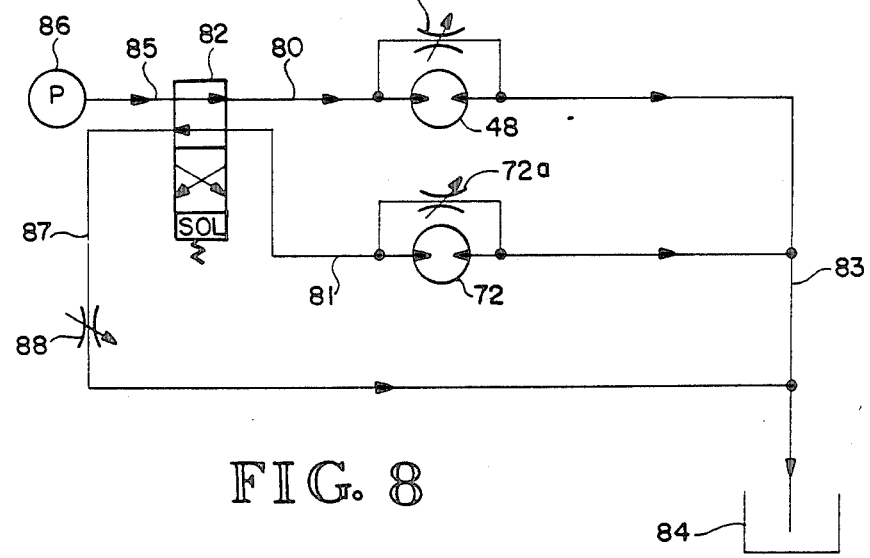
FIG. 8

TIRE SCRUBBING MACHINE FOR AUTOMATIC CAR WASHERS

DESCRIPTION

1. Technical Field

The present invention relates to tire scrubbers for automatic car washes of the type in which a rotating brush performs the scrubbing action as the vehicle is being conveyed along an established travel path.

2. Background Art

In the past, automatic wheel washers commonly scrubbed the hubcap and tire sidewall areas of the wheel with a rotating brush. Examples are shown in U.S. Pat. Nos. 2,692,214 (Hurst) and 3,822,431 (Van Brakel). On several of the more recent automobiles, this is objectionable because the scrubbing action mars the surface finish on the hubcaps and rims. Accordingly, there is a need for an improved tire scrubber that will clean sidewalls without engaging the rest of the wheel.

The solution to this tire scrubbing problem is particularly complicated on the conveyor side of an automatic car washing establishment of the type in which the conveyor employs pusher rollers engaging the back of one of the wheels, because sufficient clearance must be allowed for passage of the pusher rollers along the ground level and yet the scrubber must operate on the sidewall of the tires low enough to avoid engaging the fenders and other vehicle body parts.

DISCLOSURE OF INVENTION

The present invention aims to provide an improved tire scrubber which will effectively operate on a sidewall without engaging the wheel hubs, the vehicle body, or the pusher rollers.

A further object is to provide such a tire scrubber which does not require the conveyor to be stopped or slowed at the tire washing station and does not require the use of tire spinning rollers.

In carrying out the objects of the invention, a swing frame with a track therealong for a carriage is provided. Mounted on the carriage is a motor-driven rotary scrub brush, a brush contact limiting roller for engaging the tire side wall to limit brush contact, and a pickup roller arranged to be engaged by the tread face of the tire so that the carriage will be pulled along the swing frame by the vehicle as the vehicle is in turn pulled through the car wash establishment by the conveyor. The swing frame is operated by a pressurized cylinder unit having a doubleacting piston, and a control system is provided to deactivate the scrub brush at the end of the carriage travel corresponding to the conclusion of a scrubbing operation and to reactivate the scrub brush after return of the carriage to a start position following automatic retraction of the swing frame sufficient for the scrubbed tire to clear the pickup roller and scrub brush. The control system also controls operation of the cylinder unit to give powered retraction of the swing frame at the end of the scrubbing cycle and to urge the swing frame back toward the vehicle travel path when the carriage has been returned to a start position in preparation for the next tire scrubbing operation. When the carriage is at the start position and the swing frame swings toward the vehicle path, the carriage engages a stop, preventing the swing from fully swinging toward the conveyed vehicle path until the pickup roller has been engaged by a wheel and the carriage has been pulled along the swing frame sufficiently to clear the stop. The rotary axis of the scrub brush is tilted from the vertical about 60 degrees and the scrub brush operates on the front lower quadrant of the tire sidewall.

BRIEF DESCRIPTION OF THE DRAWINGS

FIG. 4 is a side elevational view of the machine near the start of a tire scrubbing operation;

FIGS. 5-7 are plan views showing steps in the machine cycle;

FIG. 8 is a schematic of the hydraulic circuit for the brush motor and carriage return motor;

FIG. 11 is a detail view, partly in section, of the pickup roller on the carriage; and FIG. 12 is a fragmentary detail sectional view taken like FIG. 3 and showing a modified carriage track arrangement.

BEST MODE FOR CARRYING OUT THE INVENTION

Figure 1:
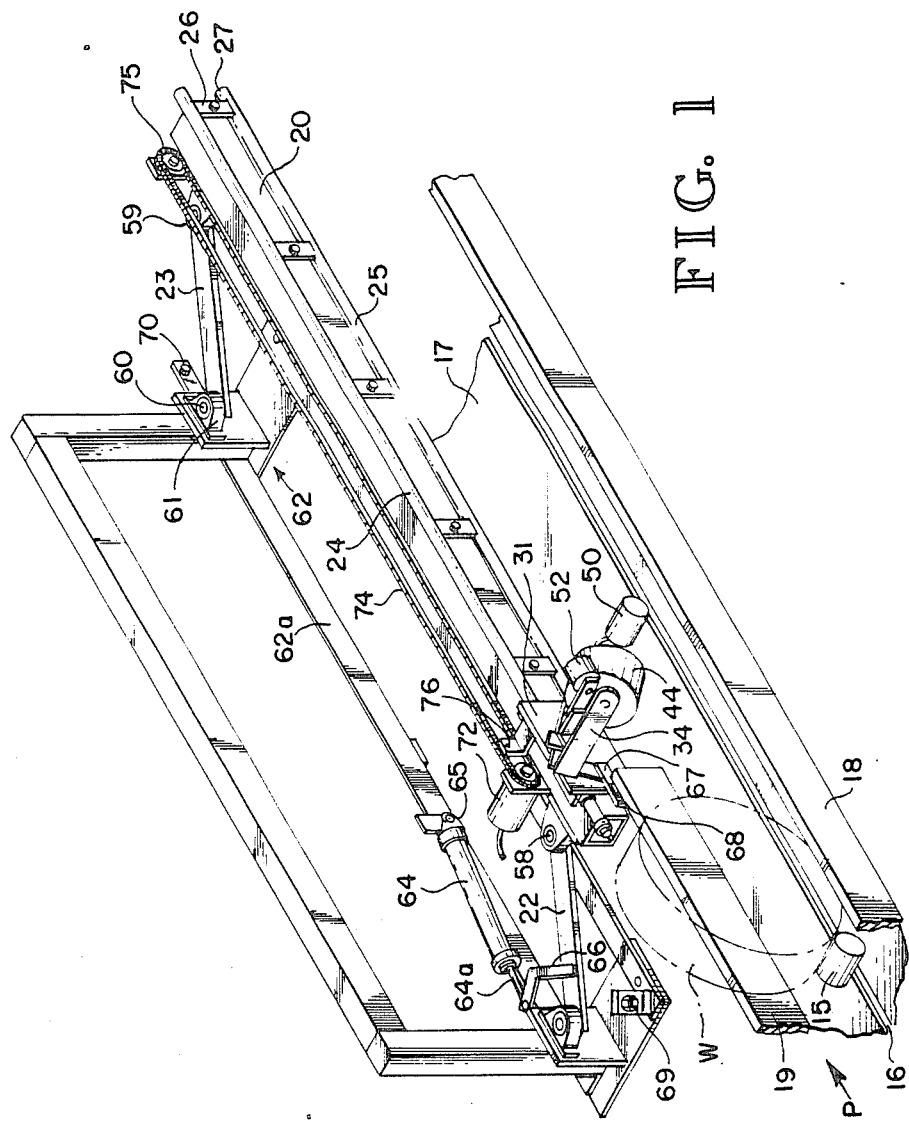
FIG. 1 is a perspective view of a tire scrubbing device embodying the invention.

Referring to FIG. 1, there is illustrated the travel path P for the wheels W at the left side of a vehicle car wash establishment of the type in which a hidden underfloor conveyor pulls pusher rollers 15 along the travel path by way of pull arms passing upwardly through a slot 16 in the floor 17 and interconnecting the conveyor and the pusher rollers. The back of one of the vehicle wheels is engaged at the entry of the travel path P by one of the pusher rollers 15, which causes the vehicle to be pulled through the car wash establishment by the conveyor. To keep the front wheels of the conveyed vehicle steered properly, the travel path for the wheels usually has inner and outer guide rails 18–19. The outer rail 19 is interrupted at the location of the tire scrubber. A suitable cleaning agent may be applied to the wheels.

Figure 3:
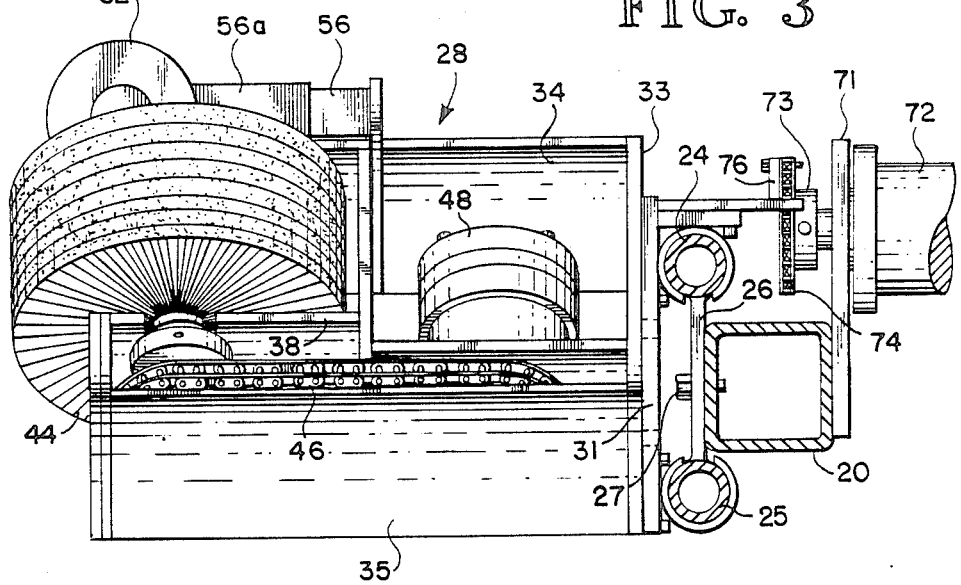
FIG. 3 is a detail vertical sectional view taken as indicated by line 3—3 in FIG. 1.
Figure 9:
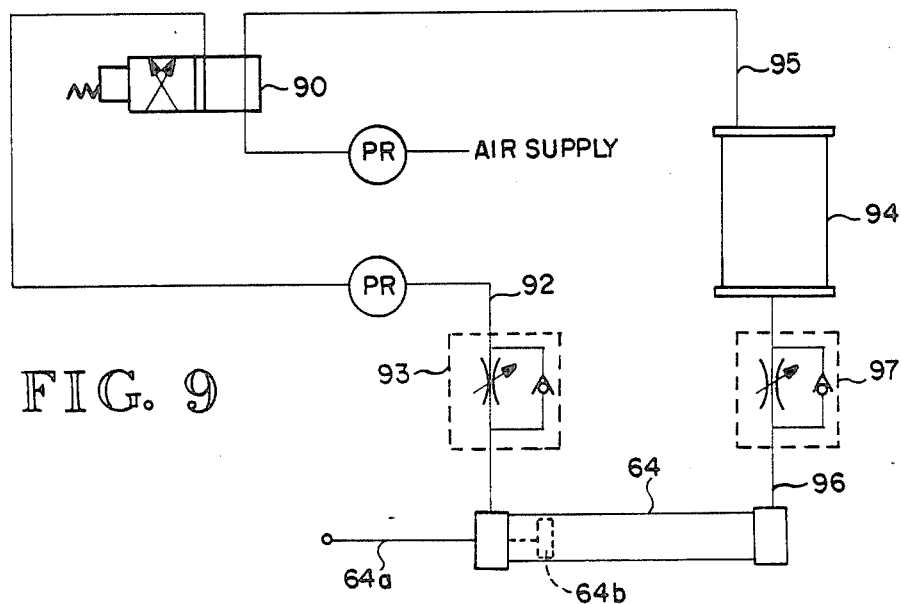
FIG. 9 is a schematic of the air and hydraulic circuit for the cylinder controlling movement of the track frame.
Figure 10:
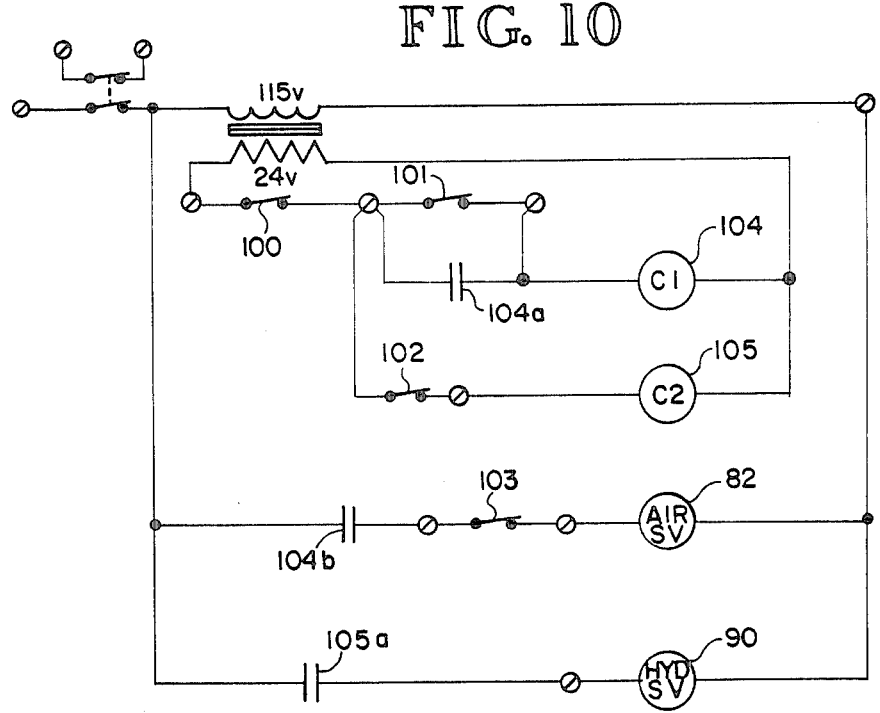
FIG. 10 is a schematic of the electrical control circuit.

Directing attention to FIGS. 1 and 3, it is seen that a tubular track frame member 20 of square crosssection is swing-mounted at the back on parallel swing arms 22–23 and has a pair of vertically spaced tubular track rails 24–25 mounted thereon at the front by way of a row of connecting brackets 26, each bolted at 27 to the frame member. A carriage 28 rides on the rails 24–25 by way of tubing bearings 29–30 bolted to a carriage mounting plate 31. Projecting forwardly from this mounting plate 31 is a carriage frame 32 having a back plate 33 from which a pair of flat support arms 34–35 extend. The carriage frame 32 also includes an intermediate flange 36 which is connected at the front to one end of a transverse member 37 connected at its other end to the arm 34. A bearing support member 38 extends forwardly from the transverse member 37 and is connected at the front to a front support plate 39.

Mounted on the arm 34 and support member 38 are a pair of bearing blocks 40–41 providing journals for a shaft 42 which carries a rotary scrub brush 44. The shaft 42 projects beyond the bearing block 41 toward the arm 35 to receive a driven sprocket 45. This sprocket meshes with a chain 46 driven by a sprocket 47 on the output shaft of a hydraulic motor 48 which is mounted on the flange 36.

Figure 2:
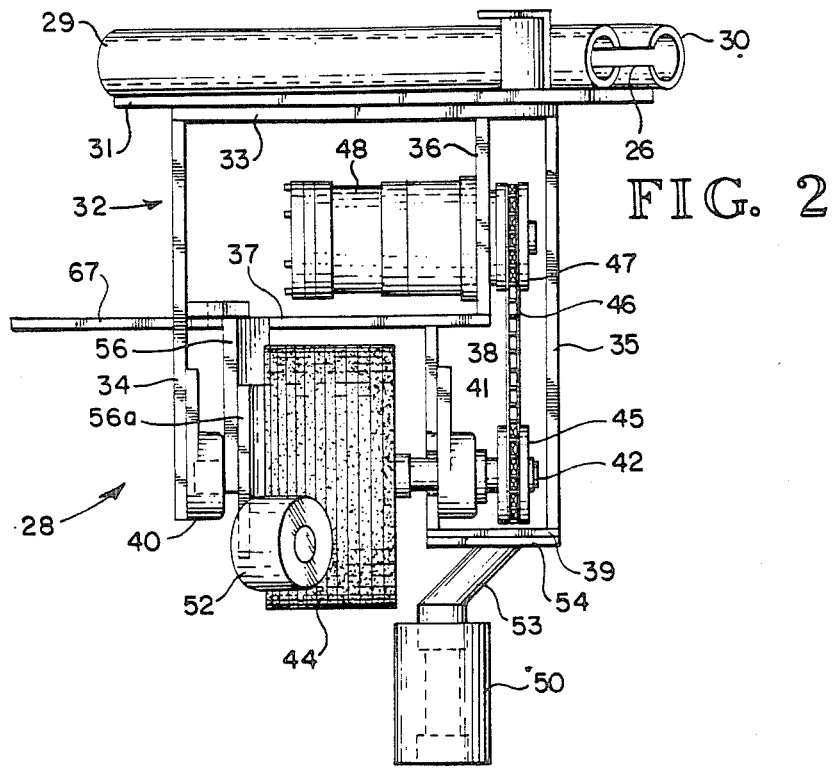
FIG. 2 is a detail top plan view of the carriage and part of the track frame, but tilted to be viewed from a plane parallel to the rotary axis of the scrub brush.

Also mounted on the carriage 28 is a forwardly projecting pickup roller 50 and a brush contact limiting roller 52. The pickup roller 50 is journaled on a stub shaft at the foot of a leg 53 which slopes from a mounting plate 54 connected to the support plate 39. The brush contact control roller 52 is a journal-mounted at the outer end of an extension 56a of an auxiliary arm 56 projecting forwardly from a connection to transverse member 37. As best seen in FIG. 2, the brush contact limiting roller 52 does not extend forwardly toward the travel path P as far as the brush 44 so that the brush bristles can defect a corresponding amount when engaging the sidewall of a tire.

It should be noted that the frame 32 of the carriage 28 is cocked at an angle of about 30 degrees from the vertical to correspondingly tilt the rotary axis of the brush 44 to about 60 degress from the vertical. This is done so that the brush 44 may operate on the advance lower quadrant of a tire scrubber and have its rotary axis located to intersect or extend adjacent to the tire axis. On the other hand, the leg 53 is skewed relative to the carriage frame so as to position the rotary axis of the pickup roller 50 in parallel relation to the ground surface as well as perpendicular to the vertical mounting plate 31. The auxiliary arm extension 56a is positioned so that the rotary axis of the brush contact limiting roller 52 is parallel to the rails 24–25 and so that the roller 52 reaches forwardly toward the travel path P less than the reach of the bristles of the brush 44 by an amount equal to the maximum bristle deflection desired when the brush 44 is performing its tire sidewall scrubbing function.

As previously mentioned, the frame member 20 is swing-mounted by parallel swing arms 22–23. Each of these arms has a forward pivot 58 in an ear 59 at the back of the frame member 20 and has a rear pivot 60 in an ear 61 mounted on a stationary base frame 62. The base frame 62 includes a horizontal member 62a to which one end of a cylinder 64 has a universal connection 65. The piston operating in the cylinder 64 is double acting and has its rod 64a pivotally connected at its outer end to a lever 66 which is fixed to the swing arm 22. Retraction of the piston rod 64a causes the swing arm 22, and hence the track frame member 20, to swing forwardly, whereas extension of the rod 64 causes the opposite motion.

The carriage frame 32 has a stop element 67 extending parallel to the guide rail 19 which is arranged to engage an adjustable stop bolt 68 projecting outwardly from the outside of the outer guide rail 19 adjacent the end thereof adjoining the tire washer. This engagement occurs when the carriage is in the "ready" position shown in FIG. 1. The purpose of the stop element 67 and stop bolt 68 is to prevent the brush 44 from swinging forwardly to an active tire-engaging position until the tread face of a tire has engaged the pickup roller 50. Then the carriage is pulled along by the engaged wheel of the conveyed vehicle without movement of the swing frame until the stop element 67 clears the stop bolt 68 and guide rail 19. At that point, the track frame 20 is free to swing on the arms 22 and 23 toward the travel path P until the brush contact limiting roller 52 engages the sidewall of the tire, as shown in FIG. 6. However, the swing arm 22 can never swing beyond a stop 69 on the base frame 62. Retraction of the track frame 20 away from the travel path P is limited by a stop 70 on the base frame arranged to be engaged by the swing arm 23.

When the carriage is at the "ready" position shown in FIG. 1, the motor 48 is operating to spin the brush 44 via the sprocket 47, chain 46, sprocket 45, and shaft 42. The brush 44 continues to spin during the entire travel stroke of the carriage along the track rails 24–25 responsive to engagement of the pickup roller 50 by the tire of the vehicle wheel W. As best seen in FIG. 3, mounted on a bracket 71 at the back of the track frame member 20 for returning the carriage to its ready position is a carriage return motor 72 connected to a drive sprocket 73 operating a continuous chain 74 meshing with an idler sprocket 75 at the other end of the track frame member 20. The carriage is connected at the back to the upper run of the chain 74 by a connector 76.

The carriage return motor 72 is in an idle condition as the carriage is pulled along the track rails 24–25 during the tire scrubbing phase of the operation so that the carriage movement is not restricted. Since the connector 76 on the chain 74 ends up with the carriage at the far end of the track frame member 20 at the conclusion of the tire scrubbing phase, activation of the return motor 72 after the unit has swung rearwardly to free the pickup roller 50 from engagement by the scrubbed tire will result in the carriage being pulled back to the other end of the unit to its ready position. During this return travel of the carriage it is preferred to have the brush motor 48 inactive.

The brush motor 48 and carriage return motor 72 are preferably hydraulic motors arranged in parallel with the parallel legs 80–81 of the hydraulic circuit connected together at one end by a four-way, two position, solenoid-operated valve 82, and connected at the other end to a dump line 83 running to a sump 84. The valve 82 has a supply line 85 from a pump 86 and a return line 87 connecting to the dump line 83. The brush motor 48 and carriage return motor 72 are by-passed with suitable flow control valves 48a and 72a, and the return line 87 preferably has a flow control valve 88 so that the carriage return motor 72 will have a slight drag effect and thereby furnish carriage resistance to travel along the tracks 24–25 responsive to vehicle tire engagement with the pickup roller 50.

The control circuitry is arranged so that the air cylinder 64 will be in a position corresponding to a retracted position of the pickup roller 50 with respect to the vehicle tire travel path P whenever a four-way solenoid valve 90 is de-energized. In this position, the piston rod 64a is extended and the piston rod end of the cylinder 64 is vented through a line 92 containing a suitable flow control/check valve unit 93. The larger side of the piston 64b is subjected to hydraulic fluid pressurized in an air/oil accumulator 94 supplied with pressurized air through line 95 from the valve 90 and connected to the cylinder 64 by a line 96 having a flow control/check valve unit 97. When the solenoid for valve 90 is energized, the smaller side of the piston 64b is pressurized and the other side is vented to the accumulator 94. This results in retraction of the rod 64a and outward swinging of the parallel arms 22–23 to move the carriage forwardly to the ready position.

The electrical circuit to control the solenoid valves 82 and 90 is a low voltage circuit which includes a normally closed entrance switch 100, normally open exit switch 101, normally open carriage return switch 102, normally closed manual retract switch 103, and two relays 104 and 105. Relay 104 controls a hold-in switch 104a and normally closed, automatic retract switch 104b. The other relay 105 controls normally open switch 105a. When this switch 105a is open, the hydraulic brush motor 48 is energized; and when the switch 105a is closed by operation of the relay 105, the hydraulic carriage return motor 72 is energized.

The entrance switch 100 is located on the track frame 20 to be opened by engagement with the carriage 28 when the carriage is at its ready position and the exit switch 101 is located on the track frame to be closed by engagement with the carriage 28 when the carriage is at the other end of the its travel and needs to be returned to the ready position. Carriage return switch 102 is located on the track frame so as to be closed when the track frame is in the retracted position.

When exit switch 101 is closed by the carriage response to the conclusion of a tire scrubbing run of the carriage along the rails 24–25, the relay 104 is energized and locked in by the responsive closing of switch 104a. The energizing of relay 104 opens switch 104b, and this de-energizes the solenoid of valve 90. As a result, the piston rod 64a is extended and the swing frame is retracted. This retraction results in closing of switch 102, which energizes relay 105 and in turn closes switch 105a. As a result, the solenoid of valve 82 is energized, thereby energizing the carriage return motor 72 and de-energizing the brush motor 48. When the carriage has returned to its ready position by operation of the motor 48, the carriage opens the entrance switch 100. This causes deactivation of the relay 104, thereby closing switch 104b to activate the solenoid of valve 90 and cause the piston rod 64a to retract and swing the swing frame outwardly until the carriage stop element 66 engages the stop 67. It also causes deactivation of relay 105, thereby opening switch 105a to de-energize the solenoid of valve 82, which responsively de-energizes the carriage return motor 72 and activates the brush motor 48. At that stage, the unit is ready for another tire scrubbing cycle.

The operating sequence of the carriage 28 is illustrated in FIGS. 5–7. FIG. 5 shows the carriage 28 in ready position at the start position on the tracks 24–25. This is also shown in FIG. 1. FIG. 6 shows the carriage 28 part way through the scrubbing cycle after the carriage has been pulled along free of the stop 67 by engagement of the pickup roller 50 with the tread face of a tire, and the track frame 20 has swung forwardly on the swing arms 22–23 until the brush contact limiting roller 52 engages the sidewall of the tire. FIG. 7 shows the carriage 28 at the finish position on the tracks 24–25 and after the track frame 20 has been swung to a retracted position in which the pickup roller 50 is fully withdrawn from in front of the wheel W.

The scrub brush 44 may be a round brush about 7 inches in diameter and about 4 inches wide. The brush contact control roller 52 may be about 3 inches in diameter, and the pickup roller may be about 3 inches in diameter and about 5 inches long. It is preferred that the carriage 28 travel along the swing frame a distance of about 7 feet.

It is important that the pickup roller 50 be high enough off the floor level to be out of the travel path of the conveyor rollers 15, and it is preferred that the brush 44 operate on the lower front quadrant of the sidewall of the tires and not engage the hubcap area. As previously indicated, it is for this reason that the rotary axis of the brush 44 is tilted at an angle of about 60 degrees with the floor level and in a plane parallel with the plane of the sidewall stripe on the tires.

It is preferred that the pickup roller 50 be axially movable relative to the carriage 28 so that when the carriage 28 swings forwardly from its ready position after the pickup roller has been engaged by the wheel W of a conveyed vehicle, the pickup roller will not have to responsively move axially in the forward direction relative to the wheel W. This preferred result is accomplished by slidably mounting the pickup roller 50 on its stub axle 150 and spring-loading the pickup roller by a spring 151 sleeved on the axle 150 between a stop collar 152 and the roller so that the roller is biased against a stop nut 153 on the free end of the axle 150. Preferably, the pickup roller 50 is counterbored at both ends to house the spring 151 and the nut 153. When the carriage 28 swings forwardly after the pickup roller 50 has been engaged and pushed by a wheel W, the axle 150 moves forwardly relative to the roller and causes compression of the spring 151. During retraction of the carriage 28 after the close of the scrubbing cycle, the spring 151 expands and forces the roller 50 to its forward limit.

Directing attention to FIG. 12, there is shown an alternative carriage mounting system in which upwardly and downwardlly facing guide channels 124–125 and a forwardly projecting track flange 126 are mounted on the tubular frame member 20 in place of the rails 24–25. A support roller 127 is journal-mounted on the mounting plate 31 to track on the track flange 126, and upper and lower guide rollers 128, 129 are journal-mounted on auxiliary mounting plates 31a, 31b projecting rearwardly from the back of mounting plate 31. The upper roller 128 bears against the forward inner face 124a of the upper guide channel 124, and the lower roller 129 bears against the rear inner face 125a of the lower guide channel 125. By this arrangement, the weight of the carriage 28 is supported by the frame member 20 via the track flange 126 and roller 127, and the carriage is retained and guided by cooperation of the rollers 128, 129 with the channels 124, 125 while the carriage travels along the track flange 126 on the frame member 20.

From the foregoing, it will be appreciated that, although specific embodiments of the invention have been described herein for purposes of illustration, various modifications may be made without departing from the spirit and scope of the invention. Accordingly, the invention is not limited except as by the appended claims.

I claim:

1. Scrubbing apparatus for scrubbing the outer sidewalls of the tires on the wheels located on one side of a motor vehicle being pulled by a conveyor through a washing facility along a vehicle path having an entry and an exit, said apparatus comprising:

an elongated frame providing a track generally parallel to said vehicle path;

a carriage movable along the track between a start position and a finish position, which is closer to the vehicle path exit than is the start position;

mounting means for the frame making it movable forwardly toward and rearwardly away from the vehicle path between a retracted position and an active position, whereat the start position of the carriage is closer than the finish position thereof is to the entry of the vehicle;

a brush rotatably mounted on the carriage and projecting forwardly toward the vehicle path;

a brush contact limiting device carried by the carriage and projecting forwardly toward the vehicle path less than the brush projects;

a pickup arm device on the carriage projecting further than the brush projects so as to be engaged by the tread of a tire on a wheel of a vehicle moving along the vehicle path and position the brush and brush contact limiting device opposite the outer sidewall of the tire;

a stop arranged to be engaged by the carriage when the carriage is at its start position and the frame is in an intermediate position between its retracted and active positions, said stop being located such as to permit the carriage to advance along the track while preventing the frame from moving from its intermediate position forwardly toward its active position until the carriage is advanced toward its finish position from its start position by way of being pushed by action of a wheel on a vehicle advancing along the vehicle path and engaging the pickup arm device with the tread face of its tire, said intermediate position being far enough from the vehicle path to prevent the control device and brush from being engaged by such tread face when the frame occupies the intermediate position;

frame moving means urging the frame forwardly toward its active position when the carriage occupies its start position and urging the frame to move rearwardly toward its retracted position when the carriage occupies its finish position;

motor means on the carriage for rotating the brush as the carriage travels from its start position to its finish position; and carriage return means on the frame for moving the carriage from its finish position to its start position when the frame is in its retracted position.

2. Scrubbing apparatus according to claim 1 in which said conveyor is of the type in which rollers are pulled along and engage the trailing side of the tread face of one of the vehicle wheels at the ground level, and said pickup arm device includes a pickup roller arranged to be engaged by the front side of the tread face of one of the vehicle wheels, said pickup roller being at a higher level than the conveyor rollers so that the conveyor rollers can pass therebeneath.

3. Scrubbing apparatus according to claim 1 in which said mounting means comprises a pair of swing arms, and said frame moving means comprises a cylinder unit with a doubleacting piston connected to one of said swing arms.

4. Scrubbing apparatus according to claim 1 in which said pickup arm device includes a pickup roller arranged to be engaged by the front side of the tread face of the tire on a wheel of a conveyed vehicle and said brush control device includes a roller arranged to engage the outer sidewall of the tire when the frame is in active position, the rotary axes of said rollers being in vertical planes perpendicular to one another.

5. Scrubbing apparatus according to claim 1 in which said brush has a rotary axis which occupies a plane parallel to the vehicle travel path and is tilted downwardly toward the exit direction of the travel path, said brush being located such as to engage the tire sidewall in the lower front quadrant thereof.

6. Scrubbing apparatus according to claim 5 in which said brush contact limiting device includes a roller arranged to engage the tire sidewall at a level above the brush, and said pickup arm device includes a pickup roller with a rotary axis at a level lower than the brush.

7. Scrubbing apparatus according to claim 1 in which said carriage return means comprises an endless chain connected to the carriage and meshing with sprockets mounted on the frame, a return motor connected to one of the sprockets, and control means for deactivating the return motor when the carriage is at its start position and activating the return motor when the carriage is at its finish position and the frame is retracted from its active position.

8. Scrubbing apparatus according to claim 1 in which said pickup arm device includes a pickup roller arranged to be engaged by the front side of the tread face of the tire on a wheel of a conveyed vehicle, said pickup roller being axially movable relative to said carriage between a forward limit and a rearward limit, and spring means biasing the pickup roller toward its foward limit whereby the carriage can move forwardly relative to the pickup roller while the carriage moves from its intermediate position toward its active position.

9. A scrubbing apparatus for scrubbing the outer sidewalls of the tire on the wheels of a motor vehicle being pulled by a conveyor through a washing facility along a vehicle path having an entry and exit;

a track parallel to the vehicle path;

a carriage on the track;

a rotary brush on the carriage and projecting forwardly toward the vehicle path, said brush having a rotary axis tilted from the vertical and occupying a plane generally parallel to the track;

a pickup arm device on the carriage projecting forwardly toward the vehicle path further than does the brush;

a brush contact limiting device on the carriage projecting toward the vehicle path less than the brush projects; and means for moving the track toward and away from the vehicle path.

10. In scrubbing apparatus according to claim 9:

said pickup arm device including a pickup roller arranged to be turned by engagement with the tread face of the tire on a wheel of a conveyed vehicle; and said brush contact limiting device including a brush contact limiting roller arranged to be turned by engagement with the outer sidewall of such tire when the pickup roller is engaged with the tread face of the tire, said brush contact limiting roller being directly above the brush and at a higher elevation than the pickup roller, and said brush being arranged to have scrubbing engagement with the lower front quadrant of the tire sidewall when the brush contact limiting roller engages it.

11. In scrubbing apparatus according to claim 10:

said rotary axis of the brush being tilted from the vertical about sixty degrees.

12. In scrubbing apparatus according to claim 10:

said pickup roller being axially movable relative to the carriage whereby the carriage can move forwardly relative to the pickup roller while the carriage moves from its intermediate position toward its active position.

13. Scrubbing apparatus according to claim 9 in which said pickup arm device includes a pickup roller arranged to be engaged by the front side of the tread face of the tire on a wheel of a conveyed vehicle, said pickup roller being axially movable relative to said carriage between a forward limit and a rearward limit, and spring means biasing the pickup roller toward its forward limit whereby the carriage can move forwardly relative to the pickup roller while the carriage moves from its intermediate position toward its active position.

* * * * *